(12) United States Patent
Erden et al.

(10) Patent No.: US 11,924,173 B2
(45) Date of Patent: *Mar. 5, 2024

(54) SENSOR NODES AND HOST FORMING A TIERED ECOSYSTEM THAT USES PUBLIC AND PRIVATE DATA FOR DUPLICATION

(71) Applicant: Seagate Technology LLC, Fremont, CA (US)

(72) Inventors: Mehmet Fatih Erden, St. Louis Park, MN (US); Walter R. Eppler, Cranberry Township, PA (US); Robert D. Murphy, Longmont, CO (US); Greg D. Larrew, Berthoud, CO (US)

(73) Assignee: Seagate Technology LLC, Fremont, CA (US)

(*) Notice: Subject to any disclaimer, the term of this patent is extended or adjusted under 35 U.S.C. 154(b) by 414 days.

This patent is subject to a terminal disclaimer.

(21) Appl. No.: 17/229,038

(22) Filed: Apr. 13, 2021

(65) Prior Publication Data

US 2021/0234844 A1 Jul. 29, 2021

Related U.S. Application Data

(63) Continuation of application No. 16/189,032, filed on Nov. 13, 2018, now Pat. No. 11,005,825.

(51) Int. Cl.
*H04L 9/40* (2022.01)
*G06F 11/10* (2006.01)
(Continued)

(52) U.S. Cl.
CPC ...... *H04L 63/0428* (2013.01); *G06F 11/1076* (2013.01); *G06N 20/20* (2019.01);
(Continued)

(58) Field of Classification Search
CPC . H04L 63/0428; H04L 63/18; H04L 63/0442; H04L 9/0827; G06F 11/1076; H04W 12/001; H04W 12/03; G06N 20/20
See application file for complete search history.

(56) References Cited

U.S. PATENT DOCUMENTS 6,088,330 A * 7/2000 Bruck ................. G06F 11/1076
709/224
7,424,514 B2 9/2008 Noble et al.
(Continued)

OTHER PUBLICATIONS

Li R, Hu Y, Lee PP. Enabling efficient and reliable transition from replication to erasure coding for clustered file systems. IEEE Transactions on parallel and distributed systems. Mar. 6, 2017;28(9):2500-13 (Year: 2017).*

(Continued)

*Primary Examiner* — Syed A Zaidi
(74) *Attorney, Agent, or Firm* — Mueting Raasch Group (57) ABSTRACT

An edge node has a central processing operable to gather sensor node data via a sensor and store at least part of the sensor node data locally in a public region of a persistent storage. The edge node backs up duplicate portions of the sensor node data to public storage regions of peer-edge nodes. The edge node receives private data from a host that is coupled to the edge computing node and the peer edge nodes, and stores the private data in a private region of the persistent storage. The private region is protected from the peer edge nodes using distributed key management.

20 Claims, 9 Drawing Sheets

(51) Int. Cl.
 *G06N 20/20* (2019.01)
 *H04L 9/08* (2006.01)
 *H04W 12/03* (2021.01)

(52) U.S. Cl.
 CPC ............ *H04L 9/0827* (2013.01); *H04L 63/18* (2013.01); *H04L 63/0442* (2013.01); *H04W 12/03* (2021.01)

(56) References Cited

U.S. PATENT DOCUMENTS

| | | | |
|---|---|---|---|
| 7,486,795 B2 | 2/2009 | Eschenauer et al. | |
| 7,818,607 B2 | 10/2010 | Turner et al. | |
| 7,996,608 B1 | 8/2011 | Chatterjee et al. | |
| 8,005,861 B2 | 8/2011 | Reddy et al. | |
| 8,433,849 B2 | 4/2013 | De Schrijver et al. | |
| 8,464,101 B1 | 6/2013 | Natanzon et al. | |
| 8,503,334 B2 * | 8/2013 | Hines | H04L 12/4645 370/254 |
| 8,554,734 B1 | 10/2013 | Chatterjee et al. | |
| 8,554,994 B2 | 10/2013 | Resch | |
| 8,666,939 B2 | 3/2014 | O'Krafka et al. | |
| 8,832,372 B2 | 9/2014 | Jibbe et al. | |
| 9,223,654 B2 | 12/2015 | Molaro et al. | |
| 9,311,184 B2 | 4/2016 | Grube et al. | |
| 9,317,576 B2 | 4/2016 | Merriman et al. | |
| 9,329,955 B2 | 5/2016 | Bernbo et al. | |
| 9,740,560 B2 | 8/2017 | Molaro et al. | |
| 9,805,108 B2 | 10/2017 | Merriman et al. | |
| 2005/0044356 A1* | 2/2005 | Srivastava | H04L 9/0827 713/163 |
| 2005/0283645 A1* | 12/2005 | Turner | G06F 11/1076 714/4.11 |
| 2008/0068899 A1* | 3/2008 | Ogihara | G06F 3/067 365/189.04 |
| 2010/0058054 A1* | 3/2010 | Irvine | H04L 63/08 726/28 |
| 2011/0047380 A1* | 2/2011 | Miller | H04L 9/0825 713/168 |
| 2012/0166726 A1* | 6/2012 | De Schrijver | G06F 11/2094 711/E12.001 |
| 2012/0311339 A1 | 12/2012 | Irvine | |
| 2013/0061049 A1 | 3/2013 | Irvine | |
| 2017/0235645 A1 | 8/2017 | Theimer et al. | |

OTHER PUBLICATIONS

NPL Search Terms (Year: 2023).*

Gheisari et al., "Nsssd: A new semantic hierarchical storage for sensor data", 2016 IEEE 20th International Conference on Computer Supported Cooperative Work in Design (CSCWD), IEEE, 2016.

Zhou et al., "RAID'ing Wireless Sensor Networks-Data Recovery for Node Failures", International Conference on Sensor Networks, vol. 2, 2014.

* cited by examiner

SENSOR NODES AND HOST FORMING A TIERED ECOSYSTEM THAT USES PUBLIC AND PRIVATE DATA FOR DUPLICATION

RELATED PATENT DOCUMENTS

This application is a continuation of U.S. application Ser. No. 16/189,032 filed on Nov. 13, 2018, which is incorporated herein by reference in its entirety.

SUMMARY

The present disclosure is directed to sensor nodes and a host that form a network tier that uses public and private data for duplication. In one embodiment, an edge computing node has an input/output bus operable to receive data from a sensor and a network interface coupled to the input/output bus that provides access to peer edge nodes via one or more networks. A persistent storage unit is coupled to the input/output bus, the persistent storage having a public region and private region. A central processing is unit coupled to the input/output bus and operable to: gather sensor node data via the sensor and store at least part of the sensor node data locally in the public region of the persistent storage; back up duplicate portions of the sensor node data to public storage regions of the peer-edge nodes; receive private data from a host that is coupled to the edge computing node and the peer edge nodes; and store the private data in the private region, the private region being protected from the peer edge nodes using distributed key management.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to distributed data and computation systems. Conventionally, client computing devices (e.g., personal computing devices) use local data storage and computation working on the signals either being collected or already collected by various sensors. In case of extra storage space needed, data is sent to the "cloud" where overall storage system at the cloud is optimized in terms of capacity, power, and performance. Use of cloud storage service is a cost effective solution to store large amounts of data. However, cloud storage may not always be ideal. For example, the user might desire not to store some specific data in the cloud, and the data stored in the cloud might not be available at all times because of bandwidth limitations. However, storing all the data locally can become costly and unmanageable.

Figure 1:
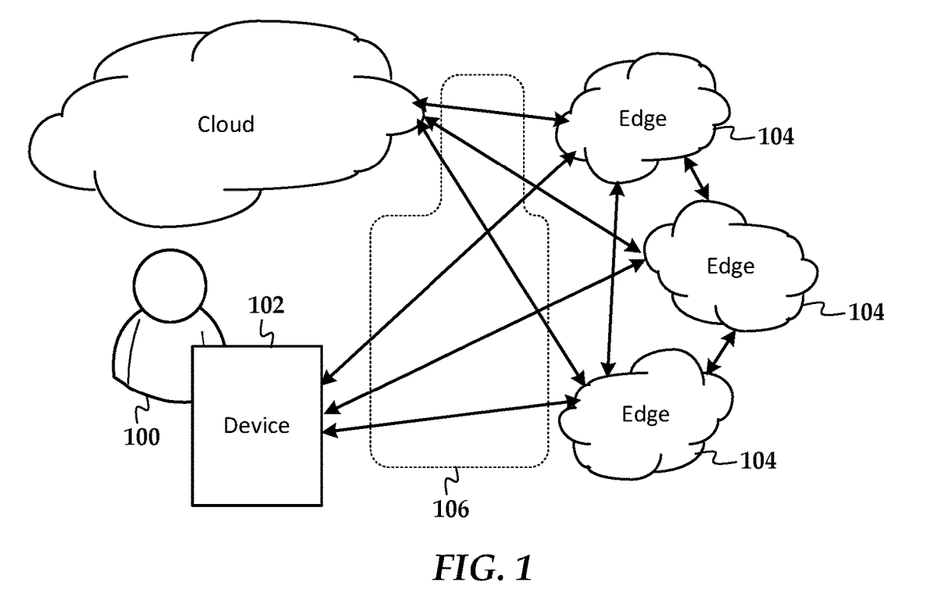
FIG. 1 is a block diagram of an edge node network according to an example embodiment.

In order to address these problems, new data storage system tiers, called "edges" are introduced. An example of a system using edge nodes according to an example embodiment is shown in the diagram of FIG. 1. An end user 100 is associated with one or more user devices 102 that may be fixed or mobile data processing devices such as desktop computers, laptop computers, mobile phones, tablets, wearable computing devices, sensor devices, external storage devices, etc. The user devices 102 are coupled to edge devices 104 via one or more networks 106. The edge devices 104 may be visualized as application-specific storage nodes local to the application, with their own sensors, compute blocks, and storage.

Eventually, some or all the data generated by the client devices 102 and edge devices 104 might be stored in a cloud service 108, which generally refers to one or more remotely-located data centers. The cloud service 108 may also be able to provide computation services that are offered together with the storage, as well as features such as security, data backup, etc. However, bandwidth-heavy computation and associated data flows can be done more efficiently within the edges 104 themselves. There can also be peer-to-peer data flow among edges 104. Because of the benefits offered by "edge" architectures, edge focused applications are increasing, and started to cover wide variety of applications.

Figure 2:
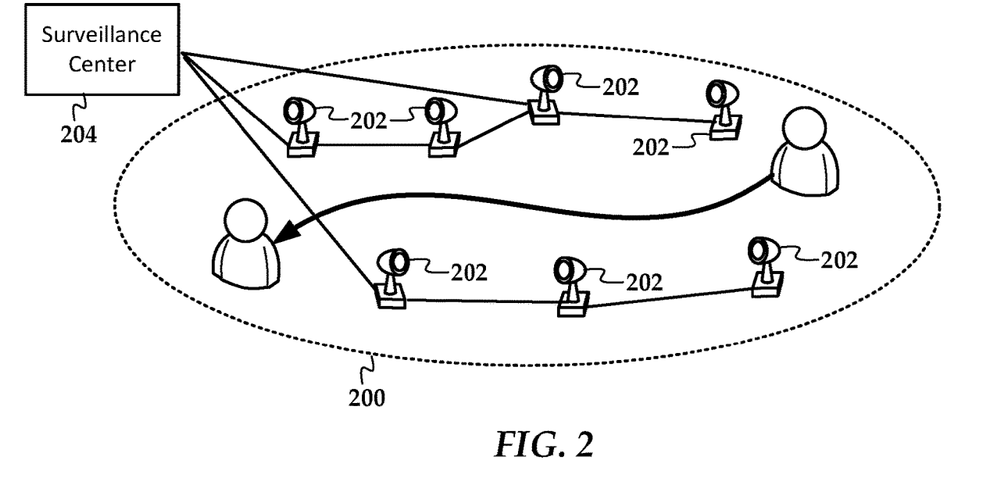
FIG. 2 is a block diagram of a surveillance system using edge nodes according to an example embodiment.

One specific application of an edge architecture is shown in the block diagram of FIG. 2, which illustrates a video recording system according to an example embodiment. This system may be used, for example, as surveillance system for a university campus. The purpose of such a system is to observe every location of the targeted premise 200 (the university campus in this example) at any time via a network of cameras 202. The cameras 202, together with a surveillance center 204, record all the data, compute to detect abnormalities or other features detected in the data, and report in a timely manner. The cameras 202 are configured as edge nodes, and therefore perform some level of computation and storage of the video data on their own.

Figure 3:
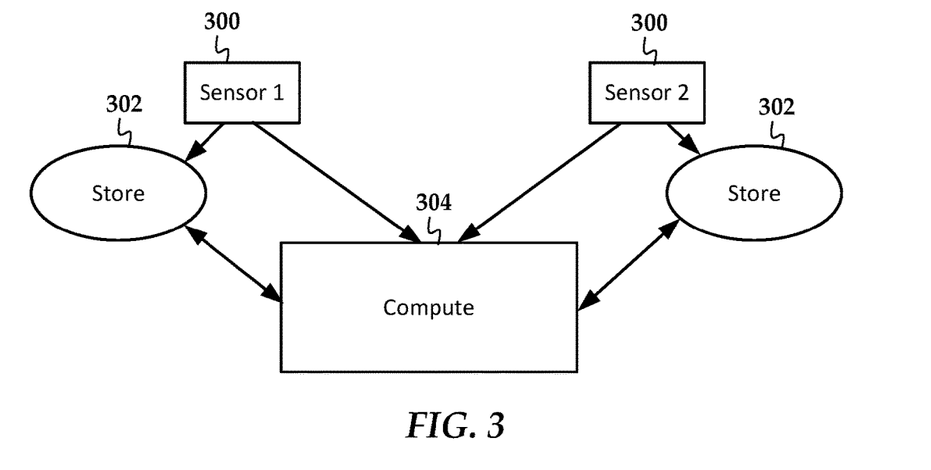
FIG. 3 is a block diagram of a compute and storage function according to example embodiments.

In order to meet the purpose of the whole system, the edge applications have "store" units used for data storage and "compute" block to execute the necessary computations for a given objective. For illustrative purposes, a block diagram in FIG. 3 shows two sensors 300 (e.g., cameras 202 in FIG. 2) connected to two store blocks 302 and a compute block 304 according to an example embodiment. Those store blocks 302 can be attached to sensors 202 in FIG. 2, or they can be located in the surveillance center 204 along with the compute block 304.

One of the challenges of arrangements as shown in FIGS. 2-3 is to guarantee cost and bandwidth efficient system robustness by ensuring data integrity and availability for any given edge application (e.g., surveillance). To address these and other issues, the present disclosure describes tiered eco-systems that define public and private data for each node within every eco-system. A data integrity and availability solution can be optimized for a given ecosystem at each tier.

Figure 4:
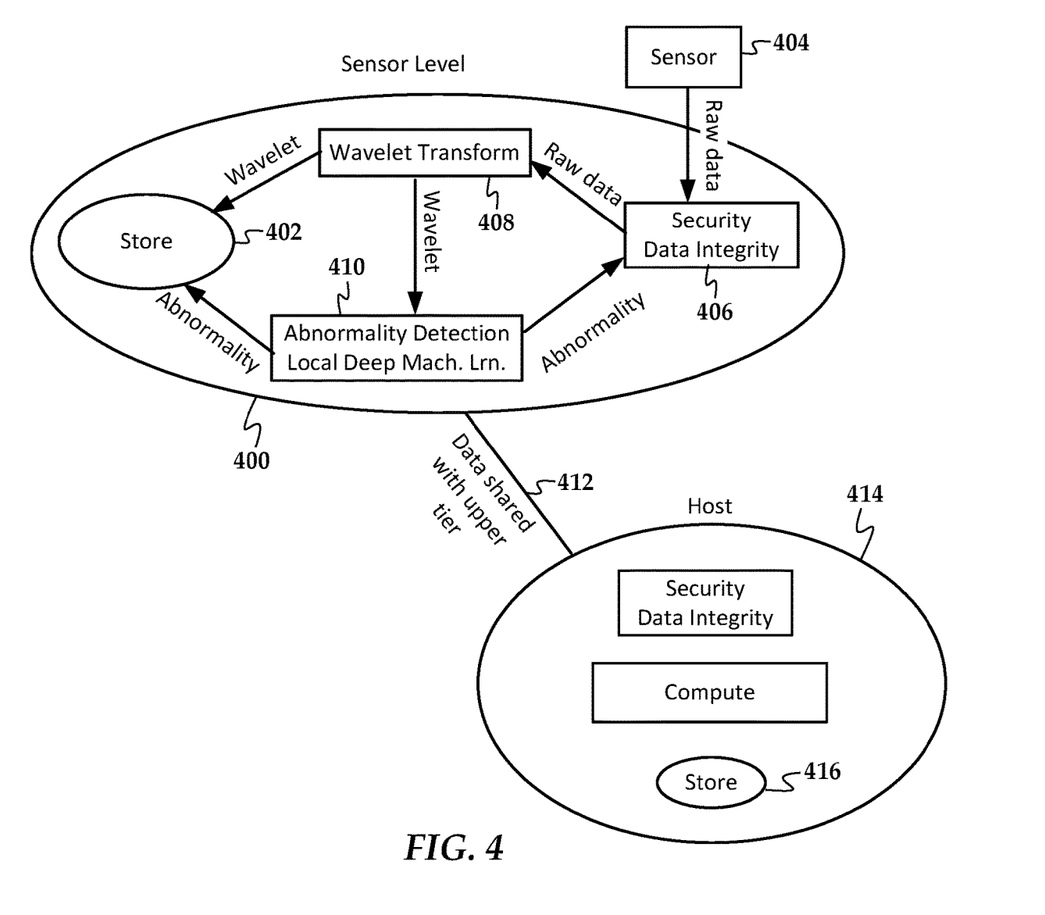
FIG. 4 is a block diagram of components of a first tier system according to an example embodiment.

For purposes of illustration, an example is presented that involves a surveillance system for an organization. In FIG. 4, a block diagram illustrates components of a lowest (first) tier eco-system according to an example embodiment. Node 400 includes a store unit 402 that persistently stores locally-generated data. A sensor 404 provides raw sensor data (e.g., video and audio streams) that are processed by a security and data integrity module 406 and a wavelet transform module 408.

The security and data integrity module 406 generally ensures that data comes only from allowed devices and that data conforms to some convention (e.g., streaming video frame format) and discards or segregates any data that does not conform. The module 406 may also be responsible to manage distributed public and private keys to ensure distributed security for private data for a given eco-tier. The wavelet transform module 408 is an example of a signal processing module that may reduce storage requirements and/or convert the data to a domain amenable to analysis. In this case, the raw video signals are converted to a wavelet format via the module 408, which maps the video data to a wavelet representation. Other types of transforms include sinusoidal transforms such as Fourier transforms.

A local deep machine learning module 410 can be used to extract features of interest from the sensor data, e.g., abnormalities in the video data. As shown, the machine learning module 410 analyzes wavelet data received from the transform module 408 and outputs abnormality data (or other extracted features) to the storage 402 and the security and data integrity module 406. As indicated by data path 412, there are also signals that go from the node 400 to a host 414 at the current tier, e.g., the first-level tier. Generally, the first level tier includes one more sensor nodes 400 and host 414. The data communicated along path 412 may also be shared with higher-level tiers (not shown), which will be described in further detail below.

At this level, the node 400 and/or first-level host 414 can be configured to ensure data availability in the store unit 400, 416 in response to local storage failure, e.g., head failures in case of hard disk drives (HDDs) and memory cell failures in case of solid-state drives (SSDs). For example, a RAID-type design can be used among heads in an HDD. For example, if the HDD has two disks and four heads, each unit of data (e.g., sector) can be divided into three data units and one parity unit, each unit being stored on a different surface by a different head. Thus, failure of a single head or parts of a single disk surface will not result in loss of data, as the data sector can be covered using three of the four units of data similar to a RAID-5 arrangement, e.g., using the three data units if the parity unit fails, or using two data units and parity if a data unit fails. In another embodiment, erasure codes may be used among heads in HDD or among cells in SSD. Generally, erasure codes involve breaking data into portions and encoding the portions with redundant data pieces. The encoded portions can be stored on different heads and associated disk surfaces. If one of the portions is lost, the data can be reconstructed from the other portions using the erasure coding algorithm.

If one of these failures happens on the sensor node 400, this can be signaled to the host 414. If the host 414 receives such a signal from the node 400 and/or determines that its own storage 416 is experiencing a similar failure, the host 414 signals another host (not shown) located at an upper tier. This alerts the higher-level system controller that caution and/or remedial action should be taken before the whole store unit 402, 416 fails. Note that this caution signaling may have different levels of priority. For example, if a storage unit 402, 416 can tolerate two head or two cell failures, then a failure of a single head/cell may cause to host 414 to issue a low-priority warning. In such a case, the non-critically disabled storage may not need any further action, but other nodes may avoid storing any future data on that node, or may only store lower-priority data.

Figure 5:
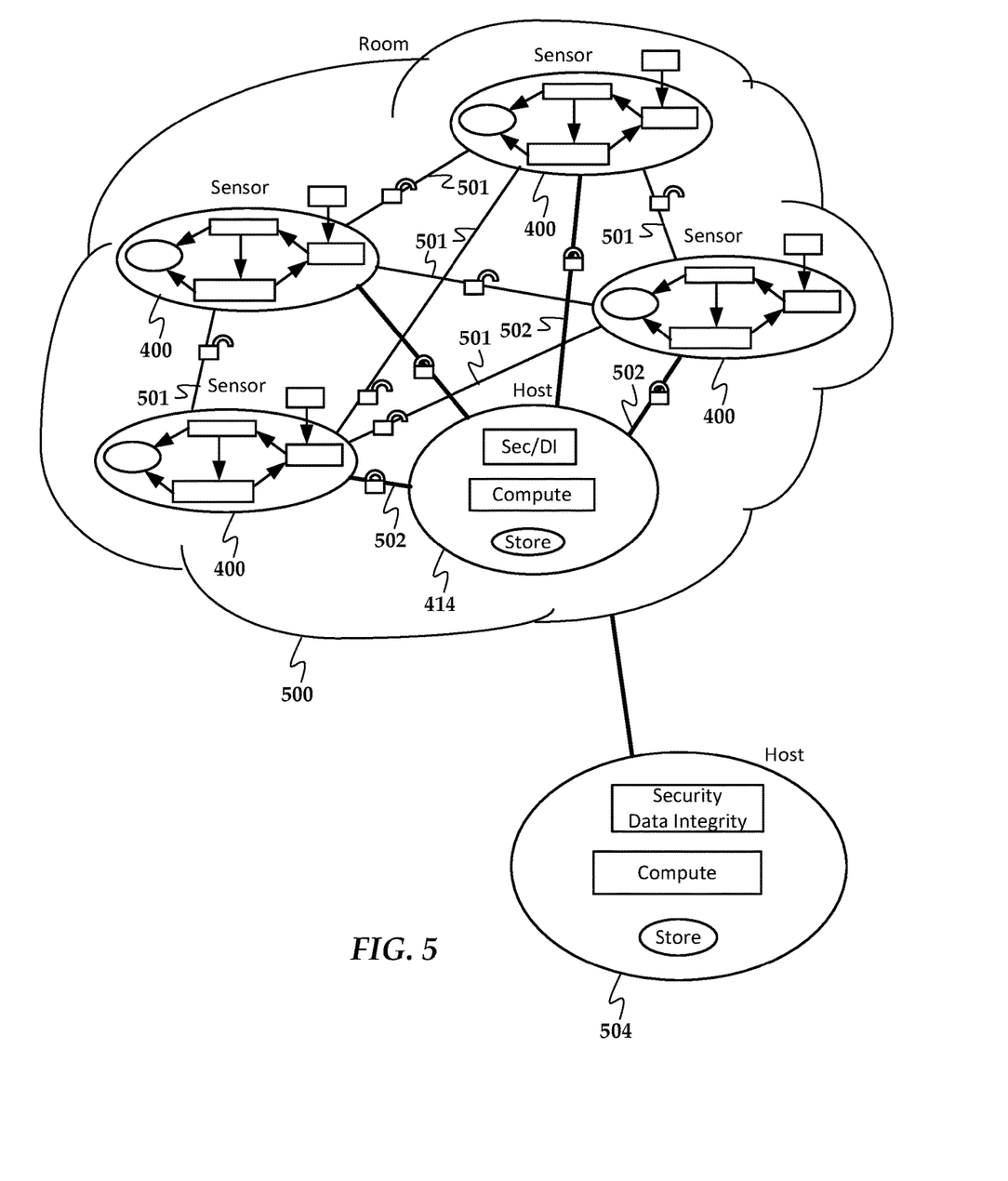
FIG. 5 is a block diagram showing a first tier ecosystem according to an example embodiment.

An eco-system 500 of the lowest, first-level, tier is shown in FIG. 5 according to an example embodiment. The term "eco-system" is intended to describe a collection of computing nodes capable of peer-to-peer intercommunication and may also imply physical proximity, but is not intended to require that the nodes are coupled, for example, using a single network infrastructure such as a TCP/IP subnet. This eco-system 500 combines a number of sensor nodes 400 and host 414 as described to form a first tier of, e.g., an interconnected sensor system. Continuing the example of a large-scale surveillance network, this sensor eco-system 500 may be configured as a surveillance sub-system for a single room.

This view shows that nodes 400, 414 of the eco-system 500 use public data paths 501 and private data paths 502, indicated by respective unlocked and locked icons. Generally, these paths may be network connections (e.g., TCP/IP sockets) using open or encrypted channels. Public data on paths 501 is shared between nodes 400 in this tier, and the private data on paths 502 is shared by the nodes 400 only with the host 414 within this eco-system 500. This differentiation of the data flowing within this eco-system 500 helps to improve data integrity and availability.

For example, one mode of failure may be a partial or whole failure of a sensor node 400. In such a case, the public data paths 501 can be used to build RAID-type system or erasure codes among sensor nodes 400 to ensure data availability and integrity. For example, each of the n-nodes 400 may divide a backup data set into n−1 files, and store the n−1 files on the other n−1 peer nodes via public paths 501. The sensor nodes 400 may also store some of this data on the host 414 via private data paths 502.

Another type of failure is failure of the host node 414. The host 414 can be rebuilt using data stored on the sensor nodes 400 via the private data paths 502. For example, the host 414 may divide a backup data set into n-files and store them separately on each of the n-nodes 400. In this context, "public data" corresponds to the data shared among other peer nodes, and "private data" corresponds to the data that is shared by the node only with the host.

Note that the public and private data paths are meant to describe the type of data that are transmitted along the paths, and is not meant to imply that the data transmissions themselves are public or private. For example, public data paths may use secure sockets layers (SSL) or other point-to-point encryption and authentication to ensure data is not intercepted or corrupted by a network intermediary, but the public data is not first encrypted by the sender before sending on the encrypted socket. As such, the public data is received in an unencrypted format by the receiving node. In contrast, a private data path would use two levels of encryption; one level using distributed keys as described below to encrypt the data as it is locally stored and the next level being the encryption for transmission as used by, e.g., SSL.

Private data is the data collected by each node 400 that is analyzed and contains the relevant data. This data is valuable to the end application at the higher levels. For a video surveillance application, this may include at least a description of the tracked objects. This is the data that is used to make decisions, and is kept and controlled only by the host 414 and within the nodes 400 that collected the parts of the whole data. In contrast, public data includes all the data which is necessary and sufficient to extract the private data. For example, the public data may include the raw or compressed sensor data. The distribution of the public data between nodes 400 utilizes bandwidth, storage, and compute resources of the system efficiently.

There can be a RAID-type design among public data for data availability and integrity. To ensure data availability and integrity for private data, nodes can use the same RAID-type design using the public-private encryption keys distributed by the host for each node. Each of the sensor nodes 400 can protect the private data from others of the sensor nodes by distributed key management to ensure distributed encryption. For example, host can use public and private key 1 for node 1, public and private key 2 for node 2, and so on. Then, each node can use the keys associated with its node to encrypt its private data and store on the same RAID-type system, like public data. Only the host knows the keys assigned to that specific node, and extract that "private" data for that node through the RAID-type system. That "public" data cannot be decrypted by other nodes since they don't have the keys, like the host node does. Such keys are not used for the public data, which allows the public data to be recovered by any of the nodes in the event of a complete node failure.

As seen in FIG. 5, the eco-system 500 communicates with a host 504 of a higher-level (second-level) tier. These communications can be managed via the host 414 of the lowest-tier eco-system 500. Multiple eco-systems 500 can be combined to form a second-level ecosystem. A second-level tier ecosystem 600 according to an example embodiment in shown in FIG. 6. This ecosystem 600 includes two or more of the sensor ecosystems 500 and a second-tier host 504.

Figure 6:
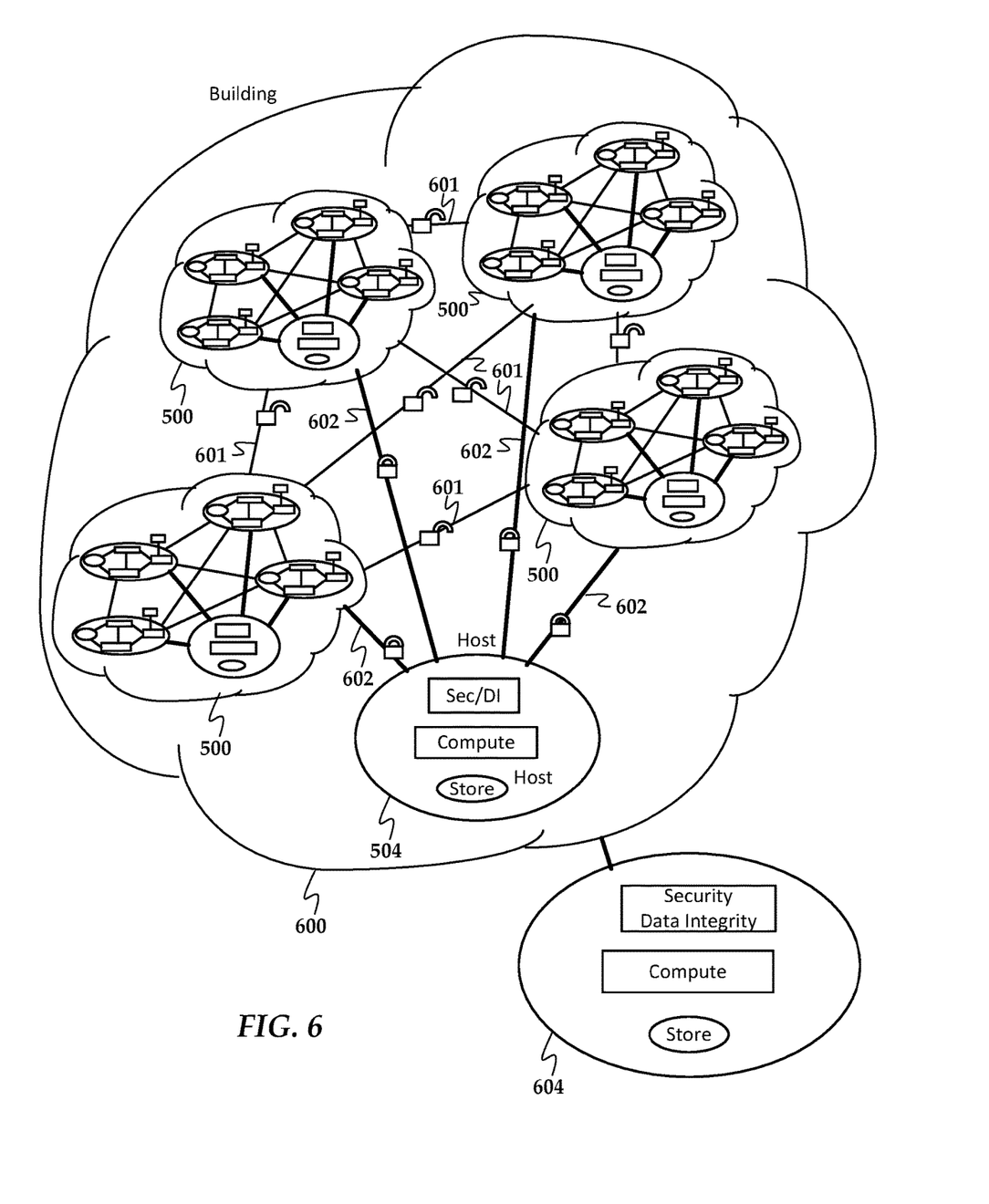
FIG. 6 is a block diagram showing a second tier of ecosystems according to an example embodiment.

As with the nodes within the sensor eco-systems 500, the second-level ecosystem 600 has public data paths 601 between the peer eco-systems 500 and private data paths 602 between the eco-systems 500 and the second-tier host 504. The redundancy features described within the individual eco-systems can be carried out between the eco-systems 500 and the second-tier host 504. For example, each of the n-eco-systems 500 may divide a backup data set into n−1 files, and store the n−1 files on the other n−1 peer eco-systems 500 via public paths 601. The eco-systems 500 may also store some of this data on the host 504 via private data paths 602, and vice-versa. The data backed up in this way may be different than what is backed up within the individual eco-systems 500. For example, higher-level application data (e.g., features extracted through machine learning) may be backed in this way, with the individual eco-systems 500 locally backing up raw and/or reduced sensor data.

In the context of a video surveillance application, the eco-systems 500 may correspond to individual rooms and other areas (e.g., entryways, inside and outside pathways, etc.) As such, the second-level ecosystem 600 may correspond to a building that encompasses these areas. In such a scenario, the communications between eco-systems 500 may include overlapping or related data. For example, the eco-systems 500 may be coordinated to track individuals as they pass between different regions of the building. This data may be described at a higher level than the sensor data from the sensor nodes within each eco-system 500, and the data backed up between eco-systems 500 and the second-tier host 504 may include data at just this level of abstraction.

Figure 7:
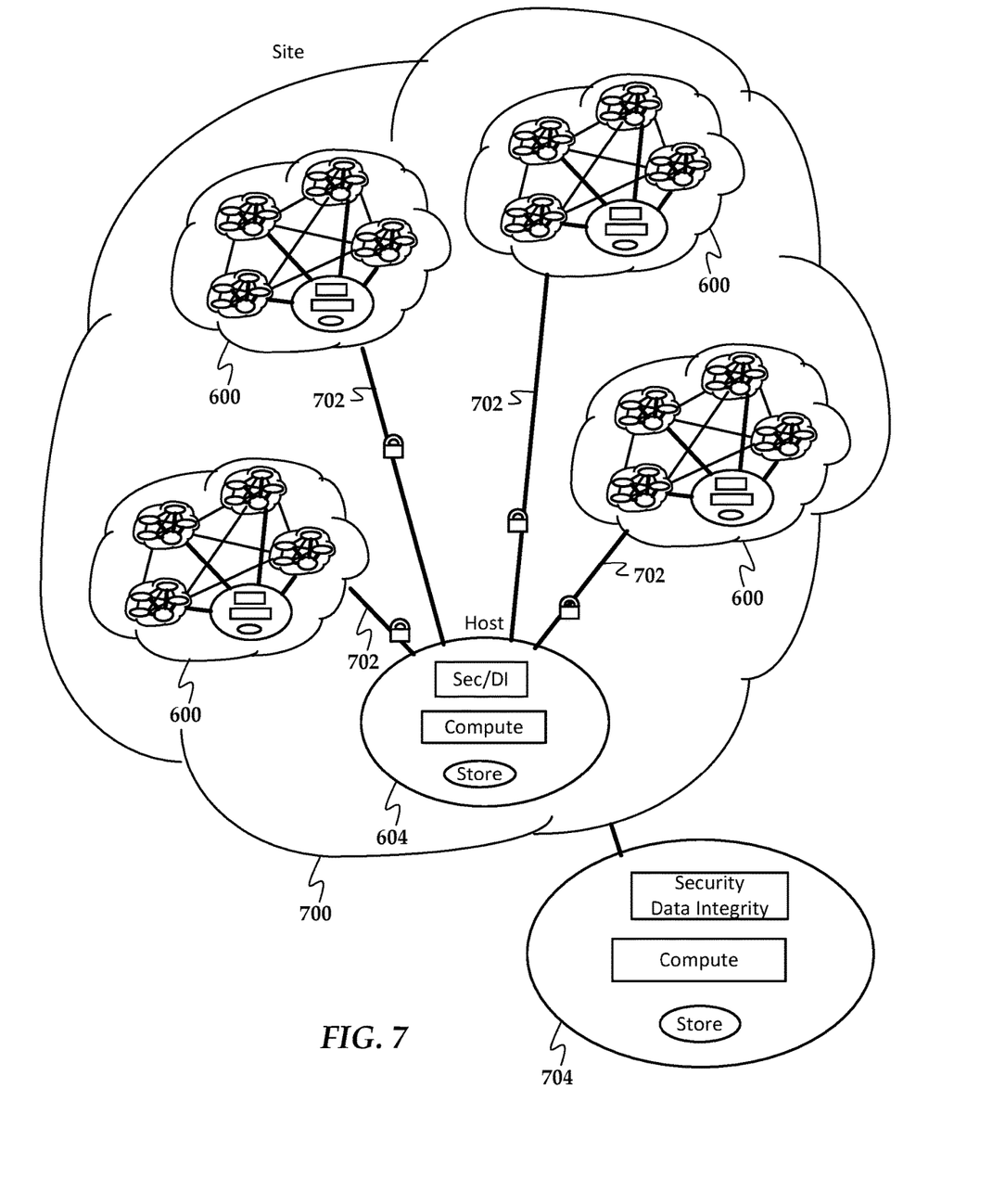
FIG. 7 is a block diagram showing a third tier of ecosystems according to an example embodiment.

The second-level ecosystem 600 communicates with a host 604 of a third tier, the third tier including a collection of second-level ecosystems 600 together with the host 604. An example of a third-tier collection 700 of second-level ecosystems according to an example embodiment is shown in the diagram of FIG. 7. There might not be any public data to utilize at this tier, and so only private data paths 702 are shown between the second-level ecosystems and the third-tier host 604. At this tier, network bandwidth may be expensive and nodes in this eco-system won't likely have that much public data to share, thus only private data is sent through the network. The private data needs to be protected because at this level, data probably goes outside the site where additional security is needed.

To ensure data availability and integrity at this level, private data can be downloaded from the host 604, and some or all of the data within each second-level ecosystem 600 and the host 604 may be sent to low cost archival storage (e.g., tape) to be sent off-site. The host 604 may also use high-performance enterprise-type RAID storage for data availability. In the surveillance system application, this third-tier collection 700 may correspond to a site or campus with multiple buildings and other infrastructure (e.g., sidewalks, roads). At this level, the data exchanged with the host 604 may be at an even higher-level than the second-level ecosystem, e.g., summaries of total people and vehicles detected on a site/campus at a given time.

Figure 8:
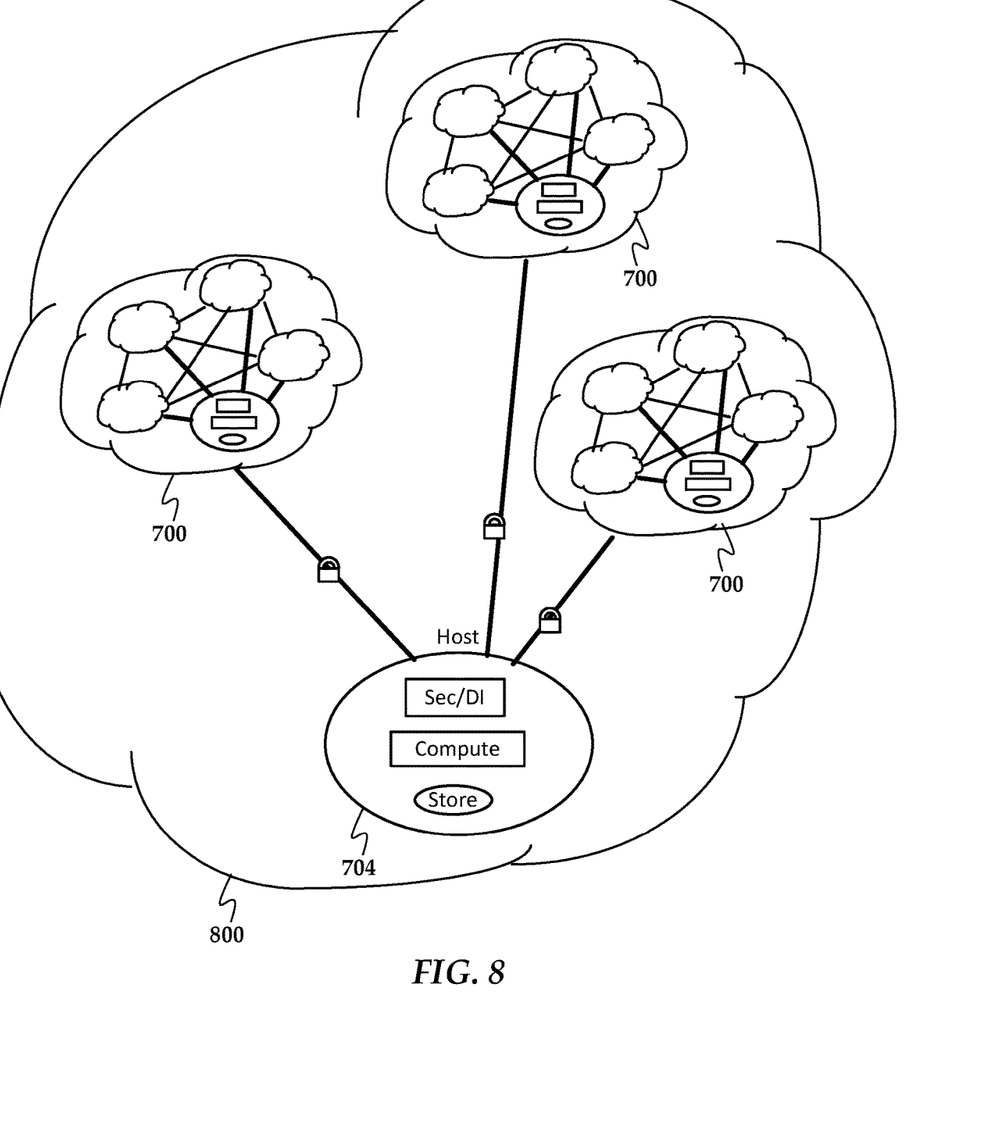
FIG. 8 is a block diagram of a top system tier according to an example embodiment.

There might be more than one site at various physical locations that belongs to the same organization, and visualizing each site as another node for the overall surveillance ecosystem can result into the final tier 800 as shown in FIG. 8 according to an example embodiment. The data integrity and availability at this level will be ensured via high-performance enterprise type RAID system for data availability at the host 704 as well as replicating host data at low cost archival storage (e.g., tape) to be sent off-site.

If there is enough bandwidth, the solutions can be based on computing using available data instead of duplicating to save storage cost. For example, in the first tier shown in FIG. 5, the data of the host 414 can be rebuilt using sensor node data instead of the host 414 duplicating its data to the nodes 400. If bandwidth and node processing is expensive, internal data duplication can be used. For example, the host 704 may use a RAID system to replicate data instead of using the nodes 700.

Figure 9:
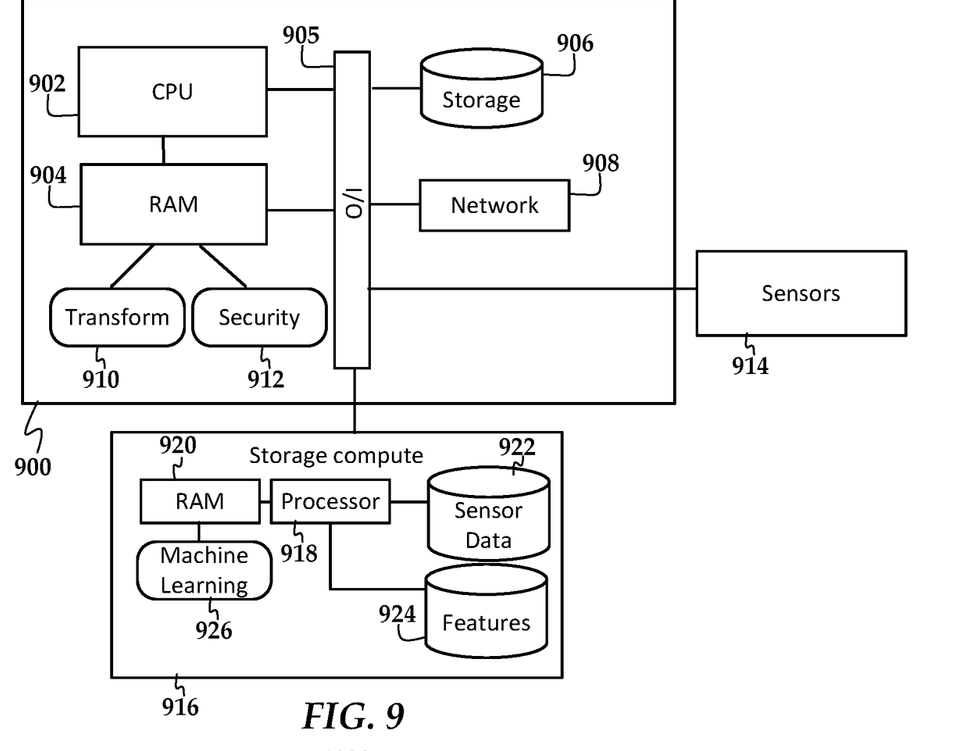
FIG. 9 is a block diagram of a computing node according to an example embodiment.

In the embodiments shown in FIGS. 3-8, the hosts and sensor nodes may use conventional computer hardware, as well as hardware that is adapted for the particular functions performed within the respective tiers. In FIG. 9, a block diagram shows components of an apparatus 900 that may be included in some or all of these computing nodes. The apparatus 900 includes a central processing unit (CPU) 902 and volatile memory 904, e.g., random access memory (RAM). The CPU 902 is coupled to an input/output (I/O) bus 905, and RAM 904 may also be accessible by devices coupled to the bus 905, e.g., via direct memory access. A persistent data storage 906 (e.g., disk drive, solid-state memory device) and network interface 908 are also shown coupled to the bus 905.

Any of the embodiments described above may be implemented using this set of hardware (CPU 902, RAM 904, storage 906, network interface 908) or a subset thereof. In other embodiments, some computing nodes may have specialized hardware. For example, a sensor node (e.g., sensor node 400 as shown in FIG. 4) may utilize an internal or external sensor 914 that is coupled to the I/O bus 905. The sensor node may be configured to perform certain computational functions, as indicated by transform and security modules 910, 912.

Note that the sensor node 400 shown in FIG. 4 also included a deep-machine learning function 410 and storage function 402. The apparatus 900 of FIG. 9 may implement those functions via the CPU 902, RAM 904, and storage 906. However, FIG. 9 shows an alternate arrangement using a storage compute device 916 that is coupled to the I/O bus of the apparatus 900. The storage compute device 916 includes its own processor 918 and RAM 920, as well as storage sections 922, 924. The storage compute device 916 has the physical envelope and electrical interface of an industry standard drive (e.g., 3.5 inch or 2.5 inch form factor), but includes additional processing functions as indicated by the machine learning module 926.

The storage compute device 916 accepts read and write requests via a standard data storage protocol, e.g., via commands used with interfaces such as SCSI, SATA, NVMe, etc. In addition, the storage compute device 916 has application knowledge of the data being stored, and can internally perform computations and transformations on the data as it is being stored. In this example, the sensor data (which can be transformed before being stored or stored in the raw form in which it was collected) can be stored in a sensor data storage section 922. The features that are extracted from the sensor data by the machine learning module 926 are stored in features storage section 924. The sections 924 may be logical and/or physical sections of the storage media of the device 916. The storage media may include any combination of magnetic disks and solid-state memory.

The use of the storage compute device 916 may provide advantage in some situations. For example, in performing some sorts of large computations, a conventional computer spends a significant amount of time moving data between persistent storage, through internal I/O busses, through the processor and volatile memory (e.g., RAM), and back to the persistent storage, thus dedicating system resources to moving data between the CPU and persistent storage. In the storage compute device 916, the stored data 922 is much closer to the processor 918 that performs the computations, and therefore can be done efficiently.

Another application that may benefit from the use of a storage compute device 916 where it is desired to keep the hardware of the apparatus 900 generic and inexpensive. The storage compute device 916 can be flexibly configured for different machine learning applications when imaging the storage media. Thus, a generic-framework apparatus 900 can be used for different applications by attaching different sensors 914 and storage compute devices 916. The apparatus 900 may still be configured to perform some operations such as security 912 and transformation 910 in a generic way, while implementing the end-application customization that is largely contained in the storage compute device 916.

Figure 10:
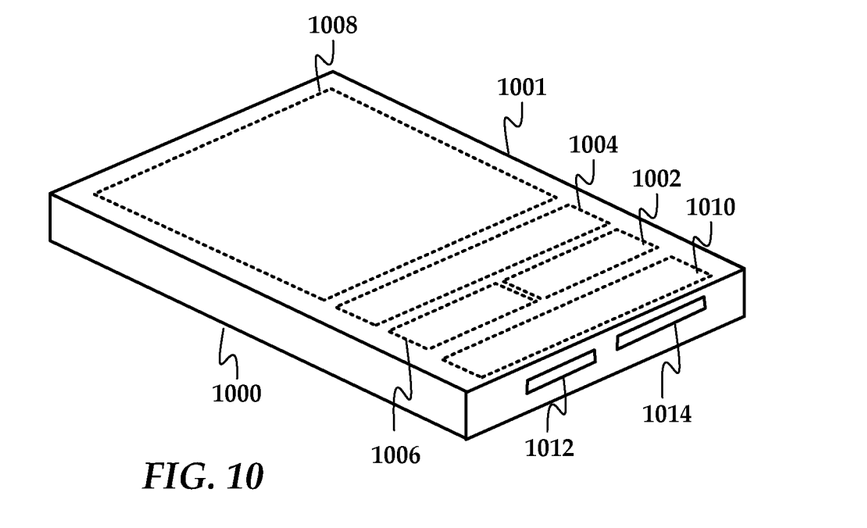
FIG. 10 is a perspective view of a storage compute device according to an example embodiment.

In FIG. 10, a block diagram shows a storage compute device 1000 according to an example embodiment. The storage compute device 1000 has an enclosure 1001 that conforms to a standard drive physical interface, such as maximum dimensions, mounting hole location and type, connector location and type, etc. The storage compute device 1000 may also include connectors 1012, 1014 that conform to standard drive physical and electrical interfaces for data and power.

A device controller 1002 may function as a central processing unit for the storage compute device 1000. The device controller 1002 may be a system on a chip (SoC), in which case it may include other functionality in a single package together with the processor, e.g., memory controller, network interface 1006, digital signal processing, etc. Volatile memory 1004 is coupled to the device controller 1002 and is configured to store data and instructions as known in the art. The network interface 1006 includes circuitry, firmware, and software that allows communicating via a network 1007, which may include a wide-area and/or local-area network.

The storage compute device 1000 includes a storage medium 1008 accessible via storage channel circuitry 1010. The storage medium 1008 may include non-volatile storage media such as magnetic disk, flash memory, resistive memory, etc. The device controller 1002 in such a case can process legacy storage commands (e.g., read, write, verify) via a host interface 1012 that operates via the network interface 1006. The host interface may utilize standard storage protocols and/or standard network protocols via the data interface 1012.

The storage compute device 1000 includes a portion of volatile and/or non-volatile memory that stores computer instructions. These instructions may include various modules that allow the apparatus 1000 to provide functionality for a sensor node as described herein. For example, the controller SoC 1002 may include circuitry, firmware, and software modules that perform any combination of security, transformation, and machine learning as described for the sensor node 400 shown in FIG. 4. The controller SoC 1002 may be able to parse and respond to commands related to these functions that are different than the legacy storage commands. For example, the controller SoC 1002 may receive queries via the host interface 1012 about where machine learning output data is stored so that it can be accessed by the apparatus 900.

Figure 11:
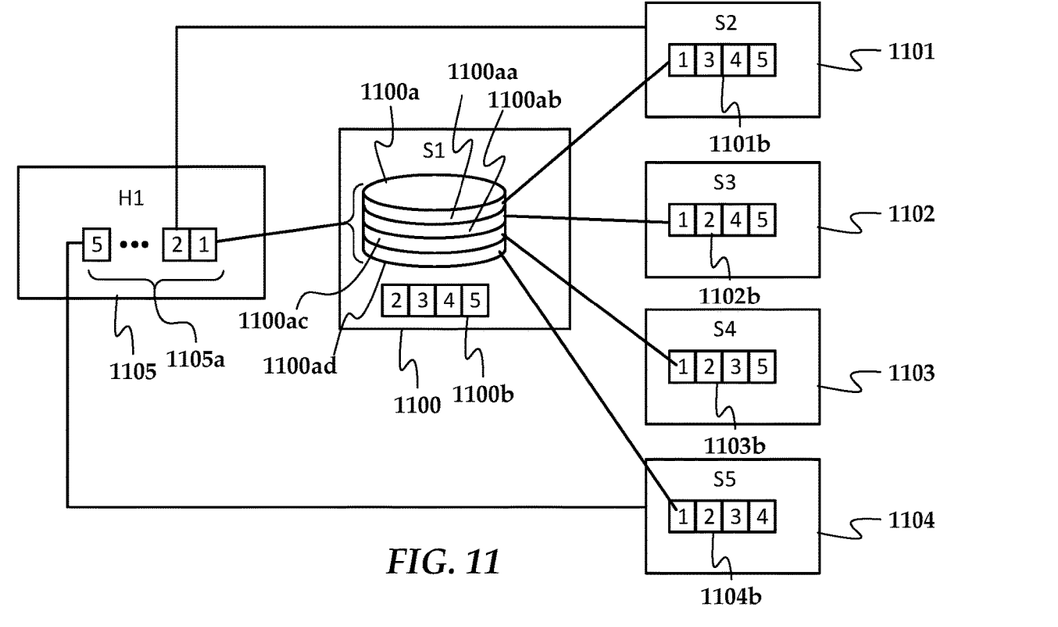
FIG. 11 is a block diagram of showing distribution of public and private data between nodes according to an example embodiment.

As previously described in relation to FIGS. 3-8, the ecosystem tiers may include public and private data storage paths that are used to store respective public and private data on various network nodes. In FIG. 11, a block diagram illustrates an example of distributed storage according to an example embodiment. For this example, five sensor nodes 1100-1104 and a host node 1105 may be coupled to form a first tier of a system. Sensor node 1100 is shown with a storage medium 1100a that is divided into four portions 1100aa-ad. These portions 1100aa-ad may correspond to different RAID-type stripes or different erasure code sections that are stored, for example, on different surfaces of a disk or different dies of a solid-state drive.

The sensor node 1100 also includes public data storage 1100b that is reserved for use by other nodes 1101-1104 of the network tier. The public data storage 1100b may be on the same or different medium as the private data 1100a. As indicated by the numbers within each block, a section of the public data storage 1100b is reserved for duplicate data of other sensor nodes 1101-1104. Similarly, sensor nodes 1101-1104 have similarly reserved public data storage 1101b-1104b for duplicate data of other nodes of the network. As indicated by the lines between the storage medium 1100a and the public data storage 1101b-1104b, the sensor node 1100 is storing duplicate parts of its data onto the other nodes 1101-1104. The other nodes 1101-1104 will also have data (not shown) that is stored on the respective sensor nodes 1100-1104.

The parts of the duplicate data stored in public data storage 1100b-1104b may directly correspond to the RAID-type stripes or erasure code segments, e.g., portions 1100aa-1100ad shown for sensor node 1100. In this way, if a portion 1100aa-1100ad has a partial or full failure, data of the failed portion can be recovered from one of the other nodes 1101-1104. This may reduce or eliminate the need to store redundant data (e.g., parity data) on the main data store 1100a.

There is also a line running from the sensor node 1100 to the host 1105. This is private data and may include a duplicate of some or all of the portions 1100aa-1100ad of the node's data 1100a, such that the private data 1100a may be fully recovered from just the host 1105. This may be used instead of or in addition to the public data storage. The host 1105 may also utilize private data paths with other sensor nodes 1100-1104 to back up its own data and/or to back up the node's data using distributed key management for distributed encryption. Here, for example, private data 1100a can be encrypted by its public key associated with node S1. The node S1 can use the RAID-type system to store this encrypted data with unencrypted public data and write to other nodes S2-S4. Since only host 1105 knows this public and private key for node S1, only host can decrypt the encrypted "private" data written on other nodes.

Note that the private and public data stored in each node 1100-1500 may use a common filesystem, such that the different classes of data are differentiated by filesystem structures, e.g., directories. In other configurations, the different data may be stored on different partitions or other lower level data structures. This may be less flexible in allocating total space, but can have other advantages, such as putting a hard limit the amount of data stored in public storage space. Also, different partitions may have different characteristics such as encryption, type of access allowed, throughput, etc., that can help isolate the public and private data and minimize impacts to performance.

Figure 12:
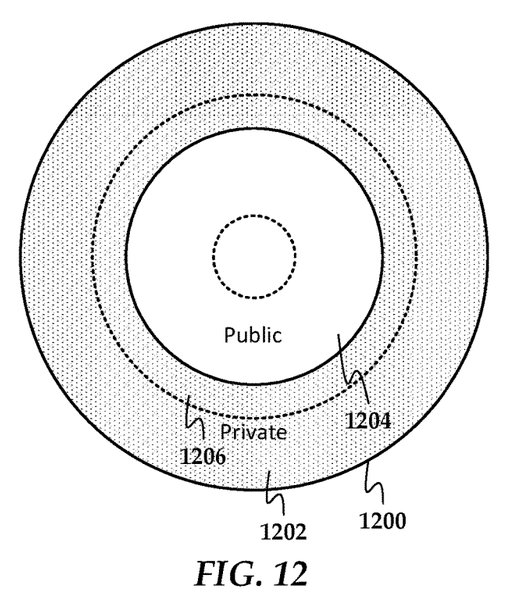
FIG. 12 is a diagram showing distribution of public and private data within a storage medium according to an example embodiment.

In FIG. 12, a diagram shows an example of how private and public data may be arranged according to an example embodiment. In this diagram, a surface of a disk 1200 is shown with private and public regions 1202, 1204. The drive may have multiple such surfaces, and the private data 1202 (shaded) may be distributed amongst outer diameter surfaces 1202 to improve performance. Further, each such surface 1202 may be configured as a RAID-like stripe or erasure code portion. The public data region 1202 is a lower priority for the device, and so uses an inner diameter region 1204. The node may store the public data for each node in the system on a different region 1204. Thus if the node uses a disk drive with four disks, there will be eight regions 1204 which can be dedicated to eight other nodes of a first-tier network, for example. If there are a different number of nodes than eight, then one node may use more than one region 1204 and/or data from two nodes can be stored on the same region 1204.

Note that the private data in region 1204 may get backed up to public data stores of other peer node, e.g., sensor nodes. As noted above, the distributed keys allow this node to backup this private data 1204 to other peer nodes along with the public data of this node, because only the host and the node that owns this data 1204 can decrypt it. In other embodiments, the network may be configured so that the peer nodes do not communicate privately shared host data with one another. Thus, data stored in a special sub-region 1206 may not be duplicated to the public data of other peer nodes. This may also be enforced at the filesystem level, e.g., designating a location, user identifier, and/or access flag that prevents this data from being duplicated to the public data of other peer nodes. It will be understood that the different regions shown in FIG. 12 can be implemented in other types of storage media such as flash memory. In such a case, the illustrated partitions may correspond to different memory chips or other data storage media components within a solid-state memory.

Figure 13:
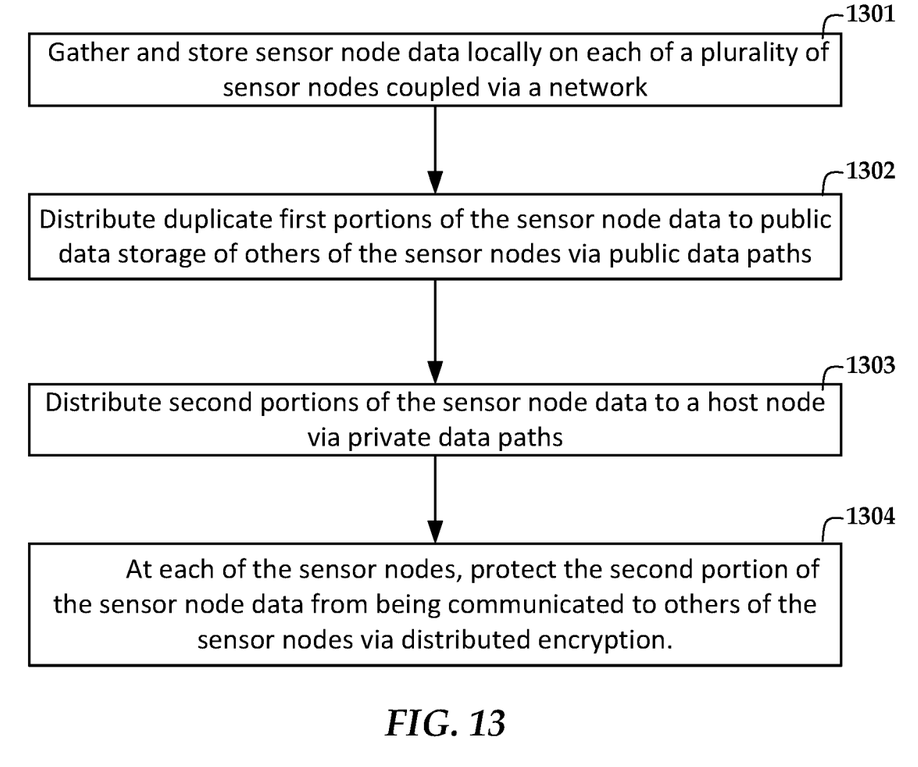
FIG. 13 is a flowchart of a method according to example embodiments.

In FIG. 13, a flowchart shows a method according to an example embodiment. The method involves gathering 1301 sensor node data and storing the sensor node data locally on each of a plurality of sensor nodes coupled via a network. Duplicate first portions of the sensor node data are distributed 1302 to public data storage of others of the plurality of sensor nodes via public data paths. Second portions of the sensor node data are distributed 1303 to a host node via private data paths. The host is coupled via the private data paths to individually communicate the respective second portions of the sensor node data with each of the plurality of sensor nodes. At each of the sensor nodes, the second portion of the sensor node data is protected from being communicated to others of the sensor nodes using distributed key management to ensure distributed encryption.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An edge computing node, comprising:
   an input/output bus operable to receive data from a sensor;
   a network interface coupled to the input/output bus and providing access to peer edge nodes via one or more networks; and
   a persistent storage coupled to the input/output bus, the persistent storage comprising a public region and private region;
   a central processing unit coupled to the input/output bus and operable to:
      gather sensor node data via the sensor and store at least part of the sensor node data locally in the public region of the persistent storage;

back up duplicate portions of the sensor node data to public storage regions of the peer-edge nodes;
receive private data from a host that is coupled to the edge computing node and the peer edge nodes; and
store the private data in the private region, the private region being protected from the peer edge nodes using distributed key management.

2. The edge computing node of claim 1, wherein the central processing unit is further operable to:
receive other duplicate portions of other sensor data generated by the peer edge nodes; and
store the other duplicate portions in the public region.

3. The edge computing node of claim 1, wherein backing up duplicate portions of the sensor node data comprises dividing the sensor node data into a plurality of files that are distributed between the peer edge nodes.

4. The edge computing node of claim 3, wherein integrity of the plurality of files is protected using erasure code portions.

5. The edge computing node of claim 3, wherein the plurality of files are stored in RAID-type stripes.

6. The edge computing node of claim 1, further comprising a deep-machine learning module, wherein the central processing unit is further operable to extract features from the sensor data in the public region, wherein data describing the features is stored in the private region.

7. The edge computing node of claim 6, further comprising a storage compute device that has a physical form factor and connectors that conform to standard drive physical and electrical interfaces, and wherein the deep-machine learning module operates on the storage compute device.

8. A processor implemented method, comprising:
gathering sensor node data via a sensor coupled to an edge computing node;
storing at least part of the sensor node data locally in a public region of a persistent storage of the edge computing node;
backing up duplicate portions of the sensor node data to public storage regions of peer-edge nodes that are coupled to the edge computing node via one or more networks;
receiving private data from a host that is coupled to the edge computing node and the peer edge nodes; and
storing the private data in a private region of the persistent storage of the edge computing node, the private region being protected from the peer edge nodes using distributed key management.

9. The method of claim 8, further comprising:
receiving other duplicate portions of other sensor data generated by the peer edge nodes; and
storing the other duplicate portions in the public region.

10. The method of claim 8, wherein backing up duplicate portions of the sensor node data comprises dividing the sensor node data into a plurality of tiles that are distributed between the peer edge nodes.

11. The method of claim 10, wherein integrity of the plurality of files is protected using erasure code portions.

12. The method of claim 10, wherein the plurality of tiles are stored in RAID-type stripes.

13. The method of claim 8, further comprising extracting features from the sensor data via deep-machine learning module, wherein data describing the features is stored in the private region.

14. A system comprising:
one or more networks each comprising a plurality of sensor nodes operable to communicate public data with each other, each of the plurality of sensor nodes operable to perform:
gathering sensor node data and storing the sensor node data locally on the sensor node;
distributing duplicate portions of the sensor node data to the public data of others of the plurality of sensor nodes via public data paths for backup storage;
extracting private data from the sensor node data and store the private data locally; and
protecting the private data from others of the sensor nodes using distributed key management to ensure distributed encryption.

15. The system of claim 14, further comprising a host that is coupled to individually communicate private host data with each of the plurality of sensor nodes, each of the sensor nodes protecting the private host data from others of the sensor nodes using the distributed key management.

16. The system of claim 14, wherein the sensor node stores different local portions of the sensor data in different regions of a storage medium, and wherein the portions of the sensor node data distributed to the public data of others of the plurality of sensor nodes portions are copies of the local portions.

17. The system of claim 16, wherein the local portions comprise RAID-type strives.

18. The system of claim 16, wherein the local portions comprise erasure code portions.

19. The system of claim 14, wherein each of the plurality of sensor nodes comprises a deep-machine learning module, wherein the private data extracted from the sensor node data comprises features extracted via the machine learning module, wherein data describing the features is communicated to a host node.

20. The system of claim 19, wherein each of the plurality of sensor nodes comprises a storage compute device that has a physical form factor and connectors that conform to standard drive physical and electrical interfaces, and wherein the deep-machine learning module operates on the storage compute device.

* * * * *